US006880129B1

(12) United States Patent
Lee et al.

(10) Patent No.: US 6,880,129 B1
(45) Date of Patent: Apr. 12, 2005

(54) METHOD AND APPARATUS FOR USING NAME SPACES IN A GRAPHICAL USER INTERFACE

(75) Inventors: Gideon Lee, Lexington, MA (US); David Skok, Lincoln, MA (US)

(73) Assignee: SilverStream Software, LLC, Billerica, MA (US)

( * ) Notice: Subject to any disclaimer, the term of this patent is extended or adjusted under 35 U.S.C. 154(b) by 0 days.

(21) Appl. No.: 09/553,586

(22) Filed: Apr. 20, 2000

Related U.S. Application Data
(60) Provisional application No. 60/131,823, filed on Apr. 29, 1999.

(51) Int. Cl.[7] .................................................. G06F 3/00
(52) U.S. Cl. ....................... 715/763; 715/760; 715/762; 717/109; 711/209
(58) Field of Search .............................. 345/760, 764, 345/840, 762–763; 717/108, 109, 116; 711/209; 715/760, 762, 763, 764, 840

(56) References Cited

U.S. PATENT DOCUMENTS

| | | | | | |
|---|---|---|---|---|---|
| 5,794,259 | A | * | 8/1998 | Kikinis ........................ | 715/507 |
| 5,973,696 | A | * | 10/1999 | Agranat et al. ............. | 345/760 |
| 6,023,578 | A | * | 2/2000 | Birsan et al. ............... | 717/105 |
| 6,115,719 | A | * | 9/2000 | Purdy et al. ............ | 707/103 R |
| 6,249,291 | B1 | * | 6/2001 | Popp et al. ................. | 345/473 |
| 6,446,109 | B2 | * | 9/2002 | Gupta ......................... | 709/203 |
| 6,476,828 | B1 | * | 11/2002 | Burkett et al. .............. | 345/760 |
| 6,558,431 | B1 | * | 5/2003 | Lynch et al. ................ | 715/513 |
| 6,598,219 | B1 | * | 7/2003 | Lau ............................ | 717/108 |

OTHER PUBLICATIONS

Microsoft Visual Basic® 5.0 Programmer's Guide. © 1997. Microsoft Press. p. 229–231.*
Bray, Tim, Dave Hollander, and Andrew Layman. "Namespaces in XML". © 1998. W3C. Nov. 17, 1998.*
Microsoft Computer Dictionary, 5th Ed. © 2002. Microsoft Press. p. 356.*
"EarthCube RemoteViz," Landmark Graphics, Inc., printed from the website www.lgc.com on Jul. 17, 2003 (pp. 1–6).
"OpenGL Vizserver™ 3.1 Application–Transparent Remote Interactive Visualization and Collaboration," Silicon Graphics, Inc., printed in 2003 (pp. 1–14).
"Chapter 5. Frame and Load Control," excerpt from *OpenGL Performer Programmer's Guide,* Silicon Graphics, Inc. website, printed Jun. 9, 2003 (pp. 1–38).
"Guide to Image Compression," derivative of an appendix of the 1993 IMSTAND report prepared by PIRA International for the Commission of the European Communities, printed from the website http://www.diffuse.org/compress.html, printed May 16, 2003 (pp. 1–10).
"Combining Local and Remote Visualization Techniques for Interactive Volume Rendering in Medical Applications," Undated, Visualization and Interactive Systems Group, University of Stuttgart, Germany (pp. 1–5).
"InfiniteReality: A Real–Time Graphics System," Montrym, John S., Baum, Daniel R., Dignam, David L. and Migdal, Christopher J., Silicon Graphics Computer Systems, published 1997, pp. 1–10, ACM Press/Addison–Wesley Publishing Co., New York, NY.

* cited by examiner

*Primary Examiner*—John Cabeca
*Assistant Examiner*—Shawn Becker
(74) *Attorney, Agent, or Firm*—Pillsbury Winthrop LLP

(57) ABSTRACT

Embodiments of the invention provide a mechanism for using name spaces in graphical user interface (GUI) page definitions. A name space designation is assigned to each control mechanism that generates definitional statements for the GUI. In one embodiment, a page control is assigned a name space designation and assigns a name space designation for each of the controls that are used to generate the page. The name space designation can be used to uniquely identify a control. The name attributes including the name space designation may be sent to a client's browser where it may be incorporated by the browser into a name-value pair when transferring data back to the control.

31 Claims, 9 Drawing Sheets

METHOD AND APPARATUS FOR USING NAME SPACES IN A GRAPHICAL USER INTERFACE

This application claims the benefit of U.S. Provisional Application No. 60/131,823, filed Apr. 29, 1999.

BACKGROUND OF THE INVENTION

1. Field of the Invention

This invention relates to generating name spaces in a graphical user interface, and more specifically, to generating name spaces for a Web page definition.

2. Background Art

Computers and computer networks are used to exchange information in many fields such as media, commerce, and telecommunications, for example. Media information may include movies, video, audio CD's, radio, newspapers, books, magazines, and computer games. Commerce information includes electronic banking and bill payment, as well as electronic purchases. Voice telephone transmissions and video conferencing are examples of telecommunication information. The exchange of information between computers typically occurs between a "server application" that provides information or services, and a "client application" that receives the provided information and services. A client application executes on a client computer or client. A server application is executed on a server computer or server.

Client applications are able to communicate with server applications executing on the same computer system or on another computer system.

Client applications are able to communicate with server applications executing on the same computer system or on another computer system accessible via a network. Computers can be interconnected via a local area network (LAN), a wide area network (WAN) and/or the Internet, for example. The Internet is an example of a world wide communications network comprised of various physical networks that interconnect a client computer with a server. The Internet offers a distributed environment wherein a client having access to the Internet can request information from a server that has access to the Internet regardless of the location of either the client or the server.

Before the advent of the Internet, users accessed server applications via a LAN or WAN, for example. The server was either a mainframe, minicomputer or other computer system. A user typically used either a terminal or a personal computer to display the information in a graphical user interface.

With the advent of the Internet, users of client systems are able to access server applications no matter how remotely the two are located as long as the client and server systems have access to the Internet. This has resulted in a desire to develop a computing architecture wherein a client can access a server application via the Internet. A client application referred to as a browser has been developed to generate a graphical user interface ("GUI") screen (or page) of information using a page definition received from a server.

If a server application is able to generate page definitions that can be read by the browser to generate and display a GUI screen, the Internet can be used to send application data to the user. Further, if a server application can receive data input by a user into a GUI screen and sent by the browser, the Internet can be used to send application data to the server application that can process the data. Thus, it is beneficial to provide tools for the generation of page definitions and process of input data.

A page definition can comprise only text. Alternatively, program logic written in a scripting language can be incorporated into a page's definition. Further, a page definition can reference small programs referred to as applets that can be transmitted to the client for execution via the Internet. Thus, both data and programs can be transmitted to the client from a server.

When a client requests a page definition from the server, the server responds by sending the page definition to the client application. A page definition can be static or dynamic. Static page definitions can be used where, for example, there is no need to modify the definition at runtime. In an interactive application, however, one screen display is dependent on input received from the user in a previous screen. Thus, there is a need when "porting" interactive applications to the Internet to be able to generate dynamic page definitions.

One problem with generating dynamic page definitions has to do with the manner in which data is transmitted in the page definition. Data is transmitted in name-value pairs. The "name" portion of the name-value pair identifies a name for a value or piece of data. The following is an example of a name value pair:

response=yes

The "name" portion (e.g., "response") typically specifies a variable in server-side program code (e.g., gateway program) that is used to process the value (e.g., "yes") in the name-value pair.

It may be desirable to use multiple program modules or instances of object-oriented objects, for example, to generate a page definition. It is possible that the different program modules used to generate a page definition may use the same name for different data. Thus, it is possible that a naming conflict can occur when generating a page definition thereby making it impossible to, for example, determine how to process the data.

The problems associated with generating a page definition can be better understood from a discussion of concepts associated with the Internet.

Internet Concepts

The Internet is comprised of many physical networks. For example, a client computer in a user's home can be connected via one or more networks that comprise the Internet to a server regardless of either's location to gain access to information that is resident on the server. A client's request can be transported via the Internet's networks to the server. A response from the server can be transmitted to the user via the Internet.

The Transport Control Protocol/Internet Protocol (TCP/IP) is the basic communications protocol for transmitting information over Internet. A communications protocol typically defines the format for a packet, or bundle, of data that is to be transmitted. A packet usually includes control information (e.g., destination, origin, packet length, etc.), the data to be transmitted and error detection and correction. Other communications protocols, such as Hypertext Transmission Protocol (HTTP) and File Transfer Protocol (FTP), are built on top of TCP/IP. Resources (e.g., servers, services, program code, and files) are accessible via the Internet and are typically referenced by a universal resource locator (URL) that identifies the resource, the location of the resource and the protocol used to obtain the resource. A URL is a mechanism by which a resource can be identified in a request. HTTP and FTP are mechanisms by which the request is communicated.

One example of a resource that can be requested by specifying a URL is a Hypertext Markup Language (HTML) document that defines a page of graphic content including graphic user interface (GUI) elements. HTML is a structural language that is comprised of HTML elements that are nested within each other.

HTML statements are typically grouped in a text file or document. The HTML statements include certain strings of characters, called tags, that mark regions of the document and assign special meaning to them. These regions are called HTML elements. Each element has a name, or tag. An element can have attributes that specify properties of the element. Blocks or components include unordered list, text boxes, check boxes, radio buttons, for example. Each block has properties such as name, type, and value. The following provides an example of the structure of an HTML document:

```
<HTML>
    <HEAD>
    .... element(s) valid in the document head
    </HEAD>
    <BODY>
    .... element(s) valid in the document body
    </BODY>
</HTML>
```

Each HTML element is delimited by the pair of characters "<" and ">". The name of the HTML element is contained within the delimiting characters. The combination of the name and delimiting characters is referred to as a marker, or tag. Each element is identified by its marker. In most cases, each element has a start and ending marker that form an HTML block. The ending marker is identified by the inclusion of an another character, "/" that follows the "<" character.

HTML is a hierarchical language. With the exception of the HTML element, all other elements are contained within another element's block. The HTML element encompasses the entire document. It identifies the enclosed text as an HTML document. The HEAD element is contained within the HTML element and includes information about the HTML document. The BODY element is contained within the HTML. The BODY element contains all of the text and other information to be displayed. Other HTML elements are described in an HTML reference manual.

An HTML document is transmitted via the HTTP communications protocol to a client that is running a software package referred to as a browser. A browser provides a GUI to display a page of information that is defined using HTML. The browser parses the HTML statements to generate and display the page's GUI elements in the browser's display area. The browser further provides a mechanism for the user to input information and/or to submit a request which the browser forwards, via the Internet, to the appropriate Internet server using a communications protocol such as HTTP.

Name-Value Pairs

An HTML element definition can include attributes, or properties, associated with data that identify its name (e.g., via a name attribute) and its value (e.g., via a value attribute). For example, in an input element such as a text box, a value attribute can specify an initial value to be placed in the text box. The name attribute can also be used as a label for the contents of the text box when it is returned to the server. The mechanism that is typically used to return data to the server is referred to as a name-value pair. FIG. 1 provides an example of the transfer of data between a client and server using name-value pairs.

Server 130 includes HTTP server 132, common gateway interface ("CGI") 134 and gateway program 136. Server 130 is connected to a client browser 120 via Internet 128. Browser 120 displays a GUI page 126 that includes GUI elements 102 and 104 that can be used, for example, to display and input text. Elements 102 and 104 can be generated from a page definition containing HTML statements, for example.

Segment 106 is a segment of the page definition that contains attribute segments 112 and 114. Attribute segments 112 and 114 contain name and value attributes that can be used to initially populate elements 102 and 104, respectively. The name attributes in attribute segments 112 and 114 associate names (i.e., "fname" and "lname") with values (i.e., "Joseph" and "Smith").

Gateway program 136 is typically written in a scripting language and can be used to output attribute segments 112 and 114. Attribute segments 112 and 114 are transmitted to HTTP server 132 and transmitted via the Internet to client browser 120.

Upon receipt, client browser 120 parses the page definition containing attribute segments 112 and 114 and displays the associated values (e.g., "Joseph" and "Smith") in elements 102 and 104 of display 126. The user can update the values contained in elements 102 and 104 and submit the updates to client browser 120. Client browser 120 sends the values contained in GUI elements 102 and 104 to server 130 via Internet 128. For example, client browser 120 can generate a POST request, for example, that includes request segment 108 that contains name-value pairs 122 and 124 in the form of the variable name specified in the "name" attribute, followed by an equals sign ("=") followed by the value (e.g., name-value pairs 122 and 124).

The POST request identifies gateway program 136 (using, for example, a universal resource locator or "URL"). When the request is received by HTTP server 132, the data (e.g., name-value pairs 122 and 124) that is contained in the request is sent to gateway program 136 using Common Gateway Interface ("CGI") 134. Gateway program 136 uses the variable name portion of name-value pairs 122 and 124 to identify the data. Gateway program 136 can, for example, include variables that correspond to the names in name-value pairs 122 and 124. The value portion in name-value pairs 122 and 124 can be assigned to these variables in gateway program 136 and/or gateway program 136 can process the data returned from browser 120.

In this example, there is only one program (e.g., gateway program 136) that is generating segment 106. However, it may be that multiple programs or program code are used to generate segment 106. It is further possible that the programs or program code that is/are used to generate segment 106 may assign the same name to a name attribute. Thus, it is possible that a naming conflict can occur where the same name is used for two or more different values.

Internet Browser and Page Definitions

In addition to name conflicts, problems arise due to the different types of browsers available for use by clients. Browsers are available from various sources. Microsoft's Internet Explorer and Netscape's Navigator and Communicator are examples of browsers. A client can run one of these or another browser to interpret the HTML statements that define a page. Browsers do not interpret HTML statements in a uniform manner. For example, one browser may be able to process a particular HTML statement while another browser may not be able to interpret the HTML statement, or may interpret it differently.

To accommodate the various browsers, a page developer (i.e., a developer of a page definition) creates different definitions that contain different HTML. Where a page definition is created at runtime, the developer must write code to test for the browser type and then generate HTML for the particular browser type. For example, a developer must write conditional code to test for the browser type and output statements to write the HTML to a page definition file (i.e., a Web page definition) that can be processed by a particular browser type.

Page definitions that are used by a browser to generate a display may contain a portion that is common to more than one definition. For example, multiple page definitions may use the same header portions. Each page definition that contains the common portion must be modified to modify the common portion. It would be beneficial to be able make the modification(s) to a common portion once and have the modification(s) propagate to each page definition that uses the common portion.

SUMMARY OF THE INVENTION

Embodiments of the invention provide a mechanism for using name spaces in graphical user interface (GUI) page definitions. A name space designation is assigned to each control mechanism that generates definitional statements for the GUI and/or receives input from a GUI. A dynamic name space designation mechanism ensures that a page's definitional statements generated by different control mechanisms do not conflict. Control mechanisms may generate definitional statements in a page definition that use a unique name to denote different entities.

In an embodiment of the invention, a control mechanism or control is implemented as an object-oriented object. The object-oriented object can be defined using the Java programming language, for example. In an embodiment of the invention, the object is a Java bean. In a design environment, the beans' appearance and behavior can be customized by a GUI or application developer. In an embodiment of the invention, a design tool is used to design a page, screen or other display. When a page design is finalized, a page object class definition is compiled and a class file is generated. Other controls defined for the page are serialized and uploaded to the server, along with any HTML that is specified at design time, to the server. A page designer can therefore generate a page control, serialized controls, and HTML in an embodiment of the invention. In one or more embodiments of the invention, the designer is executed on a client computer and the page designer (e.g., a page control, serialized controls and/or HTML) are uploaded to a server computer.

At runtime, a page control is assigned a name space designation and assigns a name space designation for each of the controls that are used to generate the page in an embodiment of the invention. A control may contain other controls. In this case, the name space designation of the control is included in each contained control's name space designation.

The name space designation can be used to uniquely identify a control. Each control uses its name space designation when generating name attributes that are included definitional statements for a Web page GUI element, for example. In one or more embodiments of the invention, the name attribute may be used as a data label and include the name space designation. As part of a data label, for example, a name space designation may be used to identify the source of the data associated with the data label. For example, a data label that contains a name space designation may be associated with attributes contained in a page definition (e.g., an HTML page definition) that is sent to a client's browser. If an attribute is returned by the browser, the data label containing the name space designation becomes part of the name-value pair used to transfer the attribute. The name attribute is sent to the browser where it may be incorporated by the browser into a name-value pair when transferring data back to the control.

Since the name portion of a name-value pair (e.g., the label) includes the name space designation of the control that generated the label, the name space designation can be used to identify the control to which the data is to be sent. In an embodiment of the invention, the page control processes each of the name-value pairs by identifying the appropriate control using the name space designation in the name-value pair, and sending the name-value pair to the identified control.

DETAILED DESCRIPTION OF THE INVENTION

Figure 1:
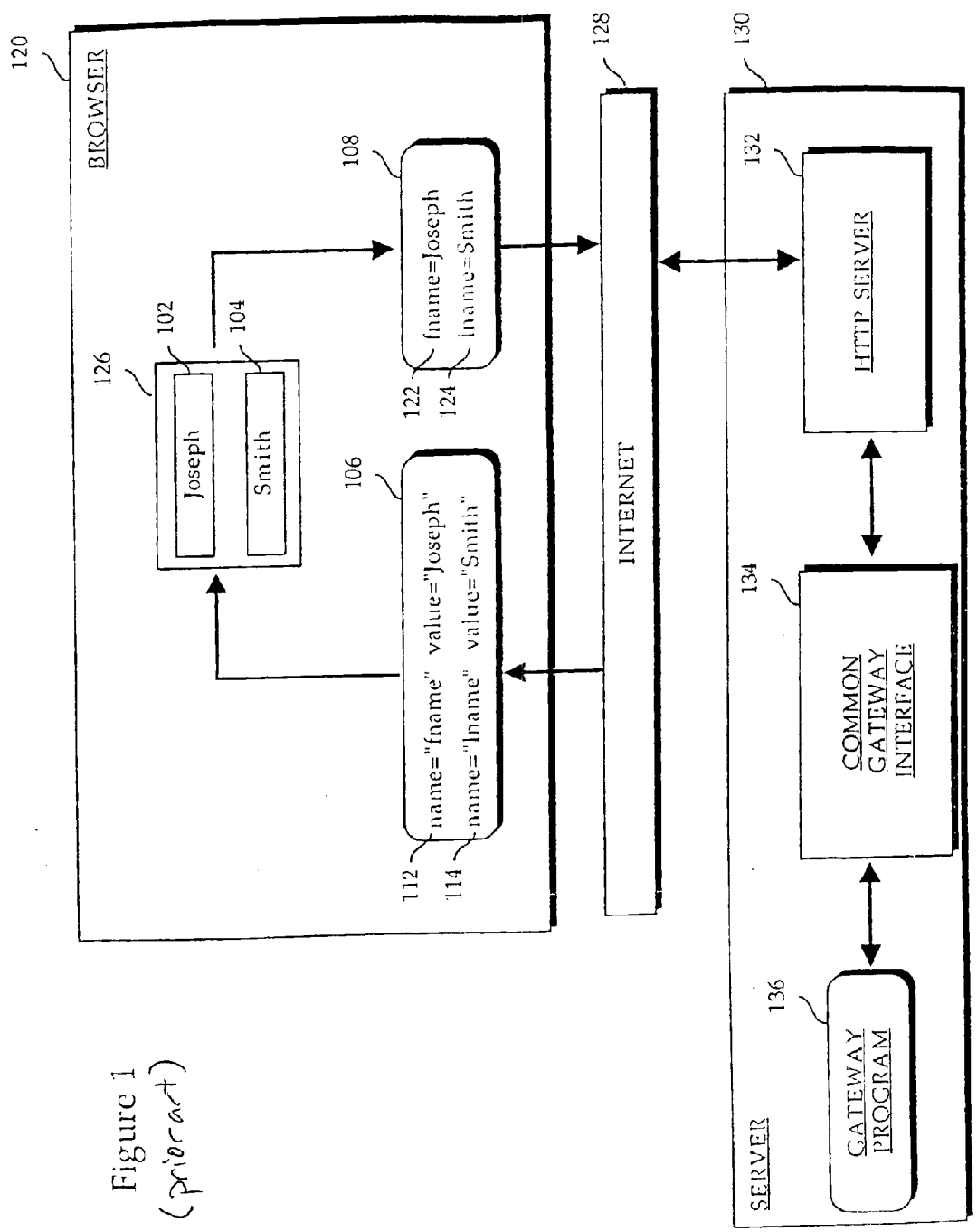
FIG. 1 provides an example of a transfer or data between a client and server using name-value pairs (prior art).

A method and apparatus for using name spaces in a graphical user interface is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In an embodiment of the invention, components of a page are modeled as control mechanisms. According to an embodiment of the invention, a control mechanism is implemented as program code such as an object-oriented object. The control mechanism is capable of generating some or all of a GUI definition (e.g., HTML statements that define a Web page). A page design environment can contain representations of control mechanisms that can be included in a page definition. For example, a palette can contain control mechanisms that may be dragged into a graphical representation of a page in the page design environment. A graphical representation of the GUI element associated with the control mechanism is displayed in the page, for example. The properties and behavior of the control mechanism may be modified in the page design environment.

In an embodiment of the invention, a control mechanism, or control, is implemented as a Java bean that may have methods, events and properties. An event is a mechanism for propagating state change notifications between a source object and target, listener objects.

The control mechanism, or control, may generate HTML, or other definition. A different definition may be generated to accommodate differences in capabilities of each browser. There is no need for a Web page designer to take into account different browser types, for example. Since the HTML generation program code is embedded in the control, browser differences can be handled by the control such that it is transparent to the page designer.

Controls are available for different GUI elements (e.g., text/input boxes or elements, radio buttons, checkbox, text block, list, etc.). In addition, a page control is associated with a Web page. In an embodiment of the invention, a page design process generates a page definition that may specify a page control definition, pre-defined HTML, and controls that are associated with GUI elements of the page.

A page that is incorporated into another page is referred to as a subpage. A subpage has an associated page control (referred to as a subpage control) and none or more controls that generate HTML. The same subpage may be used in more than one page. Therefore, a subpage's definition can be modified once and the changes are reflected in each occurrence of the subpage in another page. In addition to typical GUI elements, embodiments of the invention include HTML editing and container controls. An HTML editing control provides a mechanism for displaying rich content (e.g., database field data) in a Web page. A control that can contain other controls is referred to as a container control. For example, tab-control, data-view and layout region are examples of container controls.

A dynamic name assignment mechanism is used to generate a unique name space designation for a control such that there are no conflicts between instances of the same controls. For example, assume that a subpage that contains a "Text" control is contained within a page that also contains a "Text" control. A unique name space designation can be assigned to each "Text" control to differentiate between them. Otherwise, the HTML code that is generated by the two "Text" controls is merged into a Web page definition and may contain two name attributes generated by each "Text" instance with the same name. Thus, it will be impossible to determine from the name-value pairs returned by a browser which data value is meant for which "Text" control. A unique name space designation assigned to each "Text" control is used in naming the attributes such that the names that are generated by each control are unique.

Using embodiments of the invention, a unique name space designation is assigned to each "Text" control. The "Text" control may use its name space designation to formulate labels for data. In HTML, the labels are specified using a name attribute, for example. A name space designation followed by a "." is appended to the front of the label that is generated by each "Text" control, for example.

The name space designation may also be used to distinguish between the two instances of the "Text" control. Since a unique name space designation is associated with a control it can be used to identify the control. As is described below, the name space designation may be used to process events such as a data modification event and/or a mouse event, for example.

Figure 4A:
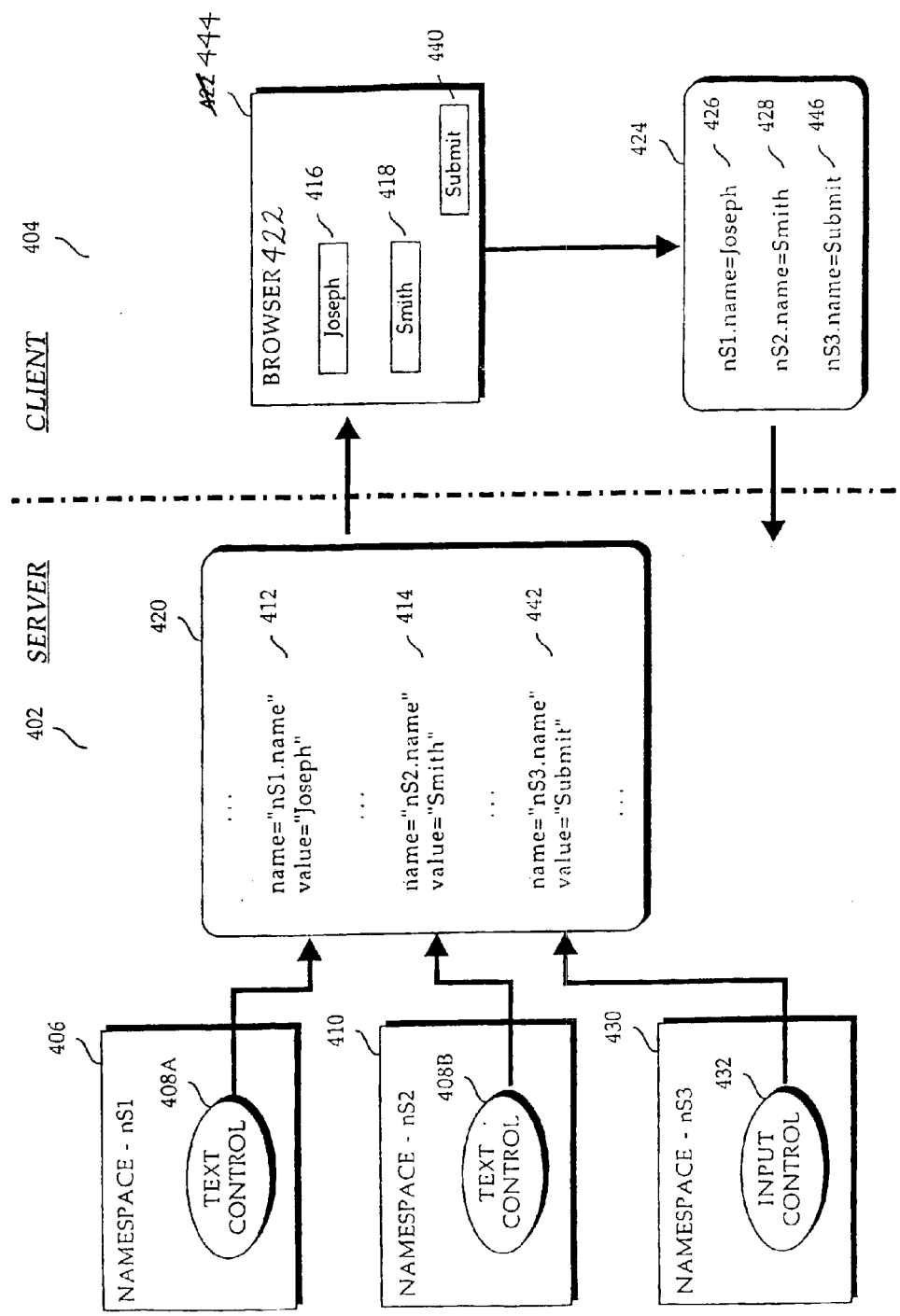
FIGS. 4A–4B illustrates a use of name spaces according to an embodiment of the invention.
Figure 4B:
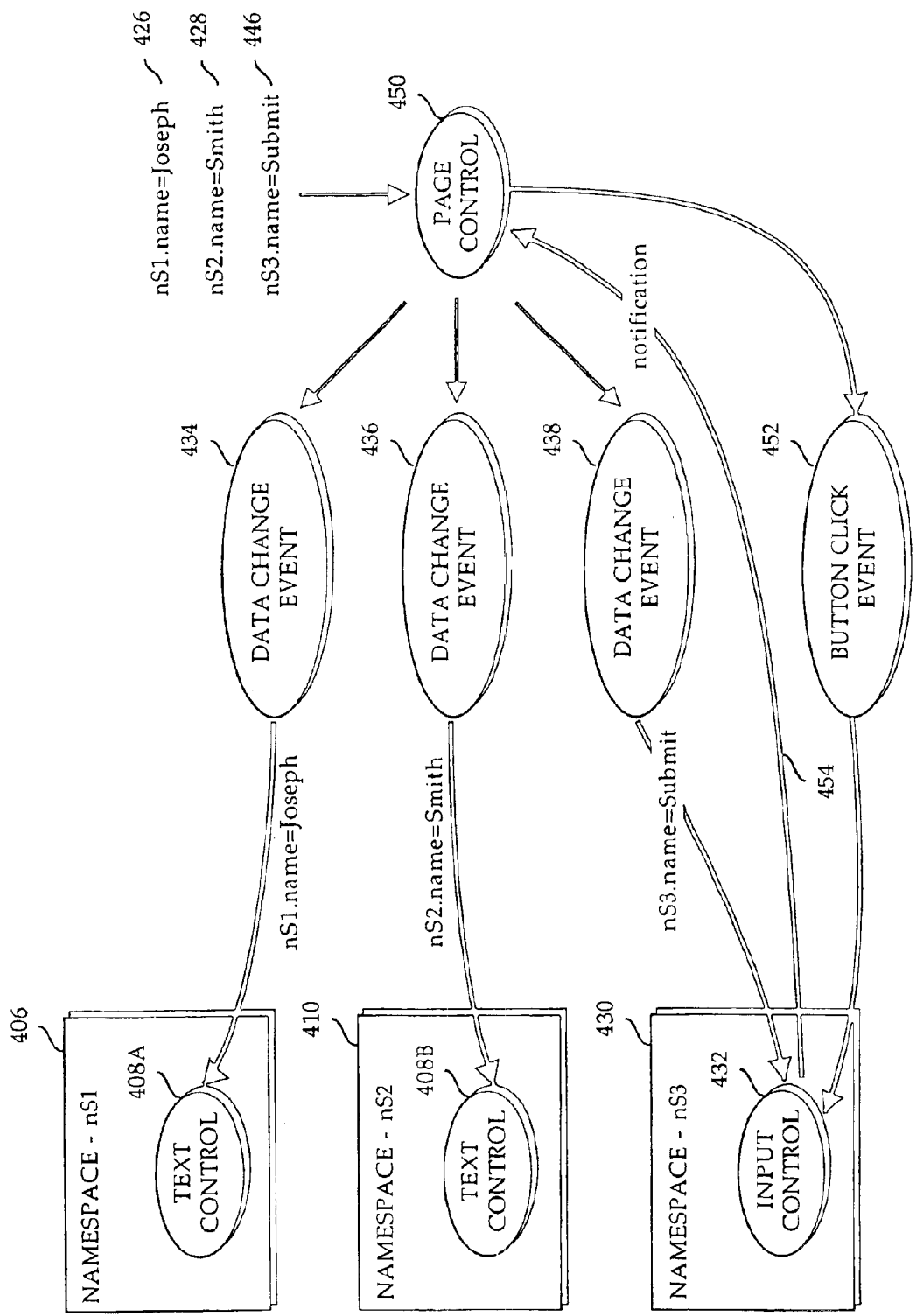

FIGS. 4A–4B illustrate a use of name spaces according to an embodiment of the invention. Referring to FIG. 4A, name spaces 406, 410 and 430 are created on server 402 for controls 408A, 408B and 432. Controls 408A and 408B are, in this example, instances of the same object-oriented "Text" control object class. However, controls 408A and 408B can be instantiated from different object classes. Control 432 is an instance of an input control object class. Controls 408A, 408B and 432 are capable of generating definitional statements that can be used to construct GUI elements 416, 418 and 440 for display in a display area of, for example, browser 422.

Box 420 contains an excerpt from the definitional statements generated by controls 408A and 408B. Segment 412 contains name and value attributes generated by control 408A for GUI element 416. Segment 414 contains name and value attributes generated by control 408B for GUI element 418. Segment 442 contains name and value attributes for GUI element 440. As discussed below, an attribute (e.g., the name attribute) contains a data label that includes a name space designation. The value attributes of segment 412 and 414 specify a value that can be used by browser 422 as an initial value for GUI elements 416 and 418, for example. The value attribute in segment 442 may be displayed as the displayed label for GUI element 440 (e.g., as a button label).

The labels that are generated by controls 408A, 408B and 430 include their name space designations. For example, given a name space designation of "nS1", control 408A generates the label "nS1.name" that consists of the name space designation followed by a "." followed by the remaining portion of the label (i.e. "name"). Similarly, control 408B uses its name space designation, "nS2", in combination with the "name" label to generate a label for its name attribute. Control 440 uses its name space designation, "nS3", in combination with the "name" label to generate a label for its name attribute. Without the name space designation, controls 408A, 408B and 440 generate the same label (i.e., "name").

On client 404, browser 422 uses the definitional statements to generate GUI elements 416, 418 and 440. GUI element 440 is used to submit the contents of display 444. When GUI element 440 is selected (e.g., with a mouse button click), the contents of GUI elements 416 and 418 are transmitted to server 402 (e.g., the user initiates a submit operation). Browser 422 transmits the data associated with GUI elements 416, 418 and 440 to server 402 using name-value pairs. Box 424 contains an example of name-value pairs 426, 428 and 446 that are generated by browser 422 for GUI elements 416, 418 and 440.

The name portion of the name-value pairs 426, 428 and 446 includes the label generated by controls 408A, 408B and 432, which includes the name space designations (e.g., "nS1", "nS2" and "nS3"). Name-value pairs 426, 428 and 446 are transmitted to server 402. The labels in the name-value pairs 426, 428 and 446 can be used to direct name-value pairs 426, 428 and 446 to the appropriate controls (e.g., controls 408A, 408B and 432, respectively) for processing the data.

As is discussed below, name-value pairs 426, 428 and 446 may be transmitted as events to controls 406, 410 and 432, respectively, in one or more embodiments of the invention.

To provide a better understanding of using name spaces in a graphical user interface, an overview of object-oriented programming, the Java programming language and program execution are provided below.

Object-Oriented Programming

Object-oriented programming is a method of creating computer programs by combining certain fundamental building blocks, and creating relationships among and between the building blocks. The building blocks in object-oriented programming systems are called "objects." An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

A class defines a type of object that typically includes both variables and methods for the class. An object class is used to create a particular instance of an object. An instance of an object class includes the variables and methods defined for the class. Multiple instances of the same class can be created from an object class. Each instance that is created from the object class is said to be of the same type or class.

To illustrate, an employee object class can include "name" and "salary" instance variables and a "set_salary" method. Instances of the employee object class can be created, or instantiated for each employee in an organization. Each object instance is said to be of type "employee." Each employee object instance includes "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

A hierarchy of classes can be defined such that an object class definition has one or more subclasses. A subclass inherits its parent's (and grandparent's etc.) definition. Each subclass in the hierarchy may add to or modify the behavior specified by its parent class. Some object-oriented programming languages support multiple inheritance where a subclass may inherit a class definition from more than one parent class. Other programming languages support only single inheritance, where a subclass is limited to inheriting the class definition of only one parent class. The Java programming language also provides a mechanism known as an "interface" which comprises a set of constant and abstract method declarations. An object class can implement the abstract methods defined in an interface. Both single and multiple inheritance are available to an interface. That is, an interface can inherit an interface definition from more than one parent interface.

An object is a generic term that is used in the object-oriented programming environment to refer to a module that contains related code and variables. A software application can be written using an object-oriented programming language whereby the program's functionality is implemented using objects.

Java Programming Language and Program Execution

Java is an object-oriented programming language with each program comprising one or more object classes and interfaces. Unlike many programming languages in which a program is compiled into machine-dependent, executable program code, classes written in the Java programming language are compiled into machine independent bytecode class files. Each class contains code and data in a platform-independent format called the class file format. A bytecode includes a code that identifies an instruction (an opcode) and none or more operands to be used in executing the instruction. The computer system acting as the execution vehicle contains a program called a virtual machine, which is responsible for executing the code (i.e., bytecode) in Java programming language class files.

Applications may be designed as standalone Java applications, or as Java "applets" which are identified by an applet tag in an HTML (Hypertext Markup Language) document, and loaded by a browser application. The class files associated with an application or applet may be stored on the local computing system, or on a server accessible over a network. Each Java programming language class file is loaded into the Java virtual machine, as needed, by the "class loader."

To provide a client with access to class files from a server on a network, a web server application is executed on the server to respond to HTTP (Hypertext Transport Protocol) requests containing URLs (Universal Resource Locators) to HTML documents, also referred to as "web pages." When a browser application executing on a client platform receives an HTML document (e.g., as a result of requesting an HTML document by forwarding a URL to the web server), the browser application parses the HTML and automatically initiates the download of the specified bytecode class files when it encounters an applet tag in the HTML document.

The classes of a Java applet are loaded on demand from the network (stored on a server), or from a local file system, when first referenced during the Java applet's execution. The virtual machine locates and loads each class file, parses the class file format, allocates memory for the class's various components, and links the class with other already loaded classes. This process makes the code in the class readily executable by the virtual machine. Native code, e.g., in the form of a dynamic linked library (DLL) 211 is loaded when a Java programming language class file containing the associated native method is instantiated within the virtual machine.

Figure 2:
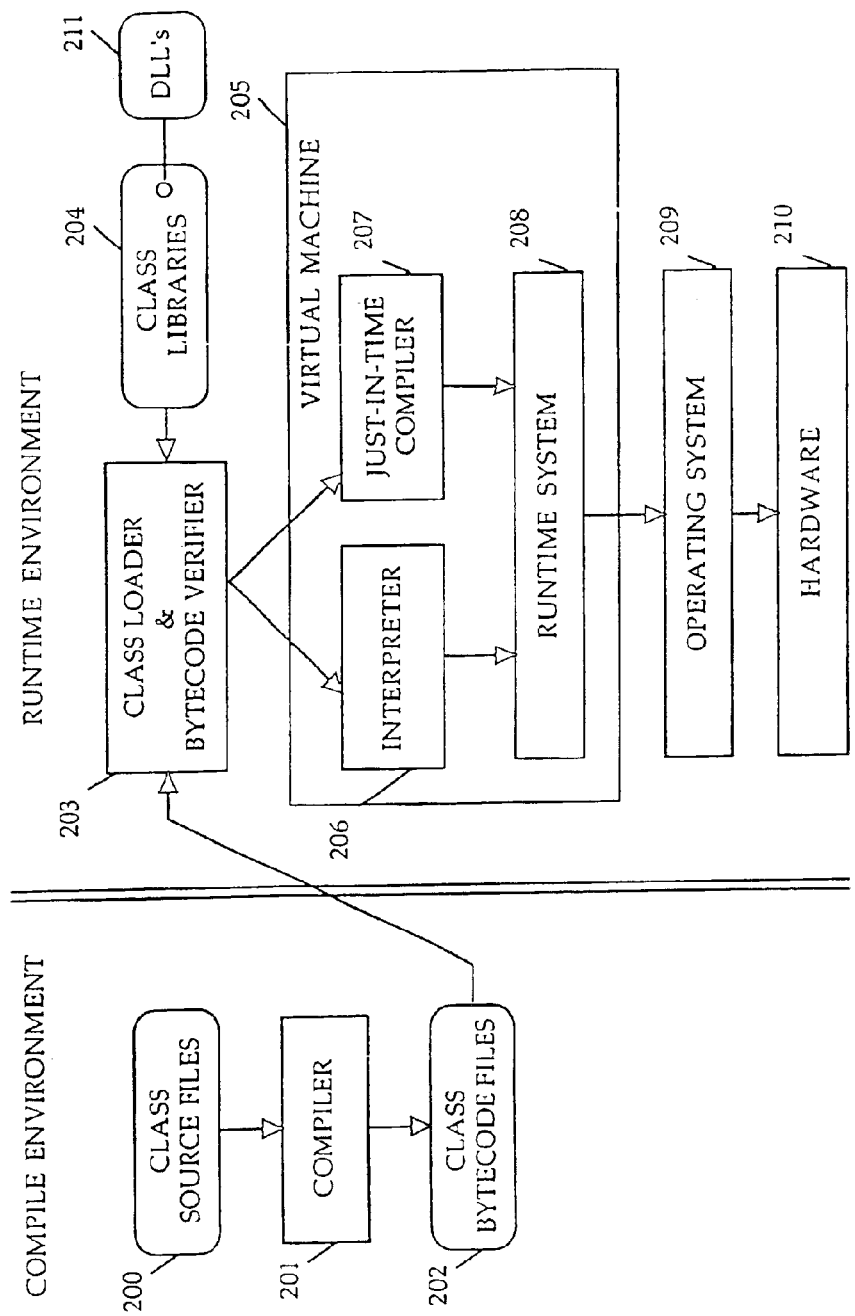
FIG. 2 illustrates the compile and runtime environments for a processing system (prior art).

FIG. 2 illustrates the compile and runtime environments for a processing system. In the compile environment, a software developer creates source files 200 written using the Java programming language, which contain the programmer readable class definitions, including data structures, method implementations and references to other classes. Source files 200 are provided to Java compiler 201, which compiles source files 200 into compiled ".class" (or class) files 202 that contain bytecodes executable by a Java virtual machine. Class files 202 are stored (e.g., in temporary or permanent storage) on a server, and are available for download over a network. Alternatively, class files 202 may be stored locally in a directory on the client platform.

The runtime environment contains a Java virtual machine (JVM) 205 which is able to execute bytecode class files and execute native operating system ("O/S") calls to operating system 209 when necessary during execution. Java virtual machine 205 provides a level of abstraction between the machine independence of the bytecode classes and the machine-dependent instruction set of the underlying computer hardware 210, as well as the platform-dependent calls of operating system 209.

Class loader and bytecode verifier ("class loader") 203 is responsible for loading bytecode class files 202 and supporting class libraries 204 written using the Java programming language into Java virtual machine 205 as needed. Class loader 203 also verifies the bytecodes of each class file to maintain proper execution and enforcement of security rules. Within the context of runtime system 208, either an interpreter 206 executes the bytecodes directly, or a "just-in-time" (JIT) compiler 207 translates the bytecodes into machine code, so that they can be executed by the processor (or processors) in hardware 210.

Interpreter 206 reads, interprets and executes a bytecode instruction before continuing on to the next instruction. JIT compiler 207 can translate multiple bytecode instructions into machine code that are then executed. Compiling the bytecodes prior to execution results in faster execution. If, for example, the same bytecode instruction is executed multiple times in a program's execution, it must be interpreted each time it is executed using interpreter 206. If JIT compiler 207 is used to compile the program, the bytecode instruction may be translated once regardless of the number of times it is executed in the program. Further, if the compilation (i.e., output of JIT compiler 207) is retained, there is no need to translate each instruction during program execution.

The runtime system 208 of virtual machine 205 supports a general stack architecture. The manner in which this general stack architecture is supported by the underlying hardware 210 is determined by the particular virtual machine implementation, and reflected in the way the bytecodes are interpreted or JIT-compiled. Other elements of the runtime system include thread management (e.g., scheduling) and garbage collection mechanisms.

Embodiment of Computer Execution Environment (Hardware)

Figure 3:
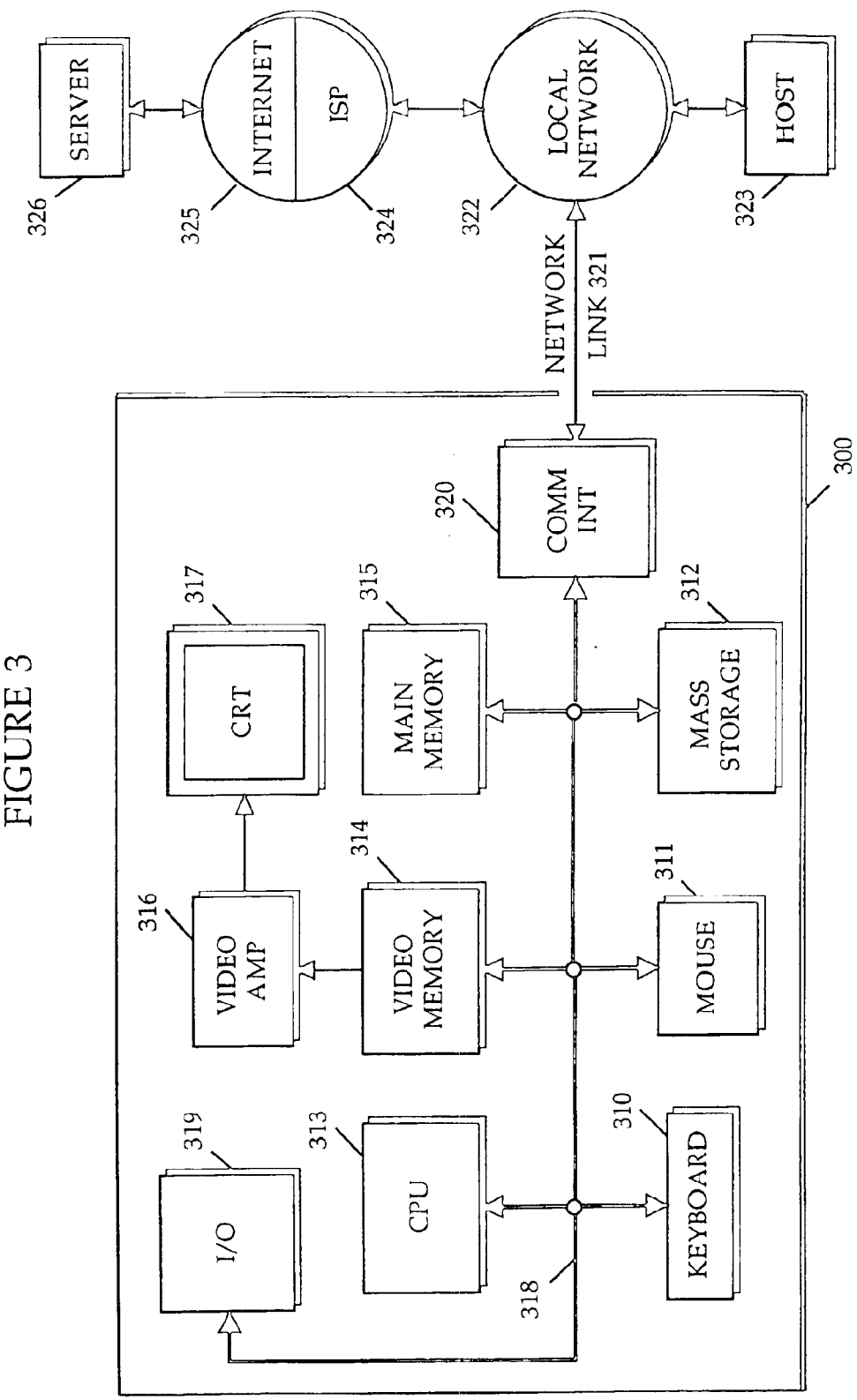
FIG. 3 is a block diagram of one embodiment of a computer system capable of providing a suitable execution environment for an embodiment of the invention.

An embodiment of the invention can be implemented as computer software in the form of computer readable code executed on a general purpose computer such as computer 300 illustrated in FIG. 3, or in the form of bytecode class files executable within a Java runtime environment running on such a computer. A keyboard 310 and mouse 311 are coupled to a bi-directional system bus 318. The keyboard and mouse are for introducing user input to the computer system and communicating that user input to processor 313. Other suitable input devices may be used in addition to, or in place of, the mouse 311 and keyboard 310. I/O (input/output) unit 319 coupled to bi-directional system bus 318 represents such I/O elements as a printer, A/V (audio/video) I/O, etc.

Computer 300 includes a video memory 314, main memory 315 and mass storage 312, all coupled to bi-directional system bus 318 along with keyboard 310, mouse 311 and processor 313. The mass storage 312 may include both fixed and removable media, such as magnetic, optical or magnetic optical storage systems or any other available mass storage technology. Bus 318 may contain, for example, thirty-two address lines for addressing video memory 314 or main memory 315. The system bus 318 also includes, for example, a 32-bit data bus for transferring data between and among the components, such as processor 313, main memory 315, video memory 314 and mass storage 312. Alternatively, multiplex data/address lines may be used instead of separate data and address lines.

In one embodiment of the invention, the processor 313 is a microprocessor manufactured by Motorola, such as the 680×0 processor or a microprocessor manufactured by Intel, such as the 80×86, or Pentium processor, or a SPARC microprocessor from Sun Microsystems, Inc. However, any other suitable microprocessor or microcomputer may be utilized. Main memory 315 is comprised of dynamic random access memory (DRAM). Video memory 314 is a dual-ported video random access memory. One port of the video memory 314 is coupled to video amplifier 316. The video amplifier 316 is used to drive the cathode ray tube (CRT) raster monitor 317. Video amplifier 316 is well known in the art and may be implemented by any suitable apparatus. This circuitry converts pixel data stored in video memory 314 to a raster signal suitable for use by monitor 317. Monitor 317 is a type of monitor suitable for displaying graphic images. Alternatively, the video memory could be used to drive a flat panel or liquid crystal display (LCD), or any other suitable data presentation device.

Computer 300 may also include a communication interface 320 coupled to bus 318. Communication interface 320 provides a two-way data communication coupling via a network link 321 to a local network 322. For example, if communication interface 320 is an integrated services digital network (ISDN) card or a modem, communication interface 320 provides a data communication connection to the corresponding type of telephone line, which comprises part of network link 321. If communication interface 320 is a local area network (LAN) card, communication interface 320 provides a data communication connection via network link 321 to a compatible LAN. Communication interface 320 could also be a cable modem or wireless interface. In any such implementation, communication interface 320 sends and receives electrical, electromagnetic or optical signals which carry digital data streams representing various types of information.

Network link 321 typically provides data communication through one or more networks to other data devices. For example, network link 321 may provide a connection through local network 322 to local server computer 323 or to data equipment operated by an Internet Service Provider (ISP) 324. ISP 324 in turn provides data communication services through the world wide packet data communication network now commonly referred to as the "Internet" 325. Local network 322 and Internet 325 both use electrical, electromagnetic or optical signals which carry digital data streams. The signals through the various networks and the signals on network link 321 and through communication interface 320, which carry the digital data to and from computer 300, are exemplary forms of carrier waves transporting the information.

Computer 300 can send messages and receive data, including program code, through the network(s), network link 321, and communication interface 320. In the Internet example, remote server computer 326 might transmit a requested code for an application program through Internet 325, ISP 324, local network 322 and communication interface 320.

The received code may be executed by processor 313 as it is received, and/or stored in mass storage 312, or other non-volatile storage for later execution. In this manner, computer 300 may obtain application code in the form of a carrier wave. In accordance with an embodiment of the invention, examples of such downloaded applications include a method and apparatus for using name spaces in a graphical user interface described herein.

Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment, including embedded devices (e.g., web phones, etc.) and "thin" client processing environments (e.g., network computers (NC's), etc.) that support a virtual machine.

Embodiment of Software Apparatus

An embodiment of the invention includes software apparatus comprising a component or collection of components configured to support using name spaces in a graphical user interface. The components may be implemented as instances of object classes in accordance with known object-oriented programming practices, or the components may be implemented under one or more component model definitions. Several component model definitions are currently available, such as COM, CORBA, and the Java component scheme referred to as Java Beans.

For example, controls can be implemented as instances of object classes implemented in an object-oriented programming language. The object class instances can be components that are implemented under one or more component model definitions.

Each component model provides for encapsulation of related functions and data structures into individual components, similar to what occurs under a standard object-oriented programming (OOP) approach. The particular mechanisms by which the components are managed and interact are defined according to the respective component model. Bridges (e.g., ActiveX) may be constructed which allow components designed under different component model definitions to interact within a single application. Interaction is typically performed through a set of methods implemented by the component. These sets of methods are referred to as "interfaces" in some component models. The public methods by which OOP object classes interact are often presented in the form of application programming interface (API) definitions.

Page Control

A special type of control mechanism referred to as a page control is associated with a Web page. The page control may generate HTML like other controls. Further, a page control is used to manage the processing of a Web page and the controls that are used to generate a Web page. In an embodiment of the invention, a page control generates a name space designation and sends the name space designation to a control when the control is first requested to generate HTML. The control uses the name space designation when, for example, generating labels for HTML name attributes. Since the name space designation is specified in the label, the label including the name space designation is used by the browser to generate the name portion of a name-value pair.

When data is returned from the browser, the page control examines the label including the name space designation and forwards (or posts) the data to the appropriate control based on the name space designation in the name-value pair. Referring to FIG. 4B, the data is posted to the appropriate control via events according to an embodiment of the invention. Name-value pairs 426, 428 and 446 become input to page control 450. Page control 450 parses name-value pairs 426, 428 and 446 and identifies, using the name space designation portion of name-value pairs 426, 428 and 446, the controls that should receive the data.

In one embodiment of the invention, page control 450 may send the data to a control in the form of an event. Data change events 434, 436 and 438 are sent to controls 408A, 408B and 432, for example. As is discussed below, a portion of control 432's response may be to notify page control 450 (e.g., notification 454) that control 432 controls the GUI element used to submit the page. Page control 450 retains this information, and sends button-click event 452 to control 432 after all of the data has been processed via the data change events.

As a submit input control (e.g., a control that manages the submit button GUI element), control 432 may include program code that is to be executed in response to a submit or button click operation. When control 432 receives button click event 452, it can execute the code associated with the event (e.g., button-click event processing).

When a page is contained within another page (e.g., a subpage), the page control that is associated with the subpage is referred to as a subpage control. Like a page control, a subpage control can be used to manage the controls within its page, generate name space designations, request that a control generate its HTML, forward posted data to the control, and invoke submit processing on a control.

Design and Run Time Processing

In embodiments of the invention, a page design environment is used to design a page. The page is comprised of a plurality of controls including a page control that can be used to generate a Web page definition and process data that is posted to the server from the client.

Page Design

In one or more embodiments of the invention, a page design environment is used to allow a user (e.g., an application developer) to drag and drop GUI elements into a GUI representation of a page. A control (e.g., a Java Bean) is associated with a GUI element and is instantiated when the element is added to the page. In one or more embodiments of the invention, the control includes none or more methods, events and properties. The instantiated control's events, methods and properties can be viewed and modified by the user in the page design environment.

In one or more embodiments of the invention, a control is implemented as a Java bean using the Java programming language and application programming interfaces (APIs). A control bean is capable of running inside a design or builder tool (i.e., within a design environment) as well as at run time. At design time, the control provides design information to the builder tool user (e.g., an application or GUI developer) and allows the user to customize the appearance and behavior of the control. Events may be defined (or modified) that notify other components of a given happening. For example, when an event or happening is detected by a control, it can notify another component by calling a method on a control that has registered as an event listener. Method code of the control may also be defined or modified in the design tool.

Further, a control's properties can be read and written via methods of the control. For example, a "foreground" property that represents the foreground color can be read by calling a "Color getForeground( )" method and modified by calling a "setForeground(Color C)" method. In addition to setting properties of the control, the design tool user can generate or modify program code for one or more of the events.

When a page design is finalized, a class that contains the event handling code (e.g., a page control) is generated. For example, if the control is written using the Java programming language or other object-oriented programming language, its program code is generated and compiled into a class (e.g., a Java class file). If the page design environment runs on the client, the page control class that represents the page design is uploaded to the server. The controls that were included in the page's design are serialized and sent, along with any HTML that is specified at design time, to the server.

A page design can therefore include a page control (containing event handling program code), serialized controls and HTML in an embodiment of the invention.

At run time, the page object that was designed using the builder tool can be instantiated and its methods can be called by other components (e.g., another bean or object instance) or from a scripting environment, for example.

Page Generation

When the page is invoked on the server, the page class is loaded (e.g., a page load event) and instantiated together with the HTML and the de-serialized controls. After the page is loaded, the HTML for the page can be generated by the controls. A page generation engine (e.g., the page control) requests each control to generate the HTML as needed. In addition, a unique dynamic name space designation is generated (e.g., by the page control or a subpage control within another page) for each control. A mapping between the name space designation and its corresponding control is retained. A control may use its name space designation to generate labels for use with HTML name attributes, for example. For example, when generating a label that is assigned to a name attribute in an HTML definitional statement, the control appends the dynamic name space designation to the front of the label.

Figure 5A:
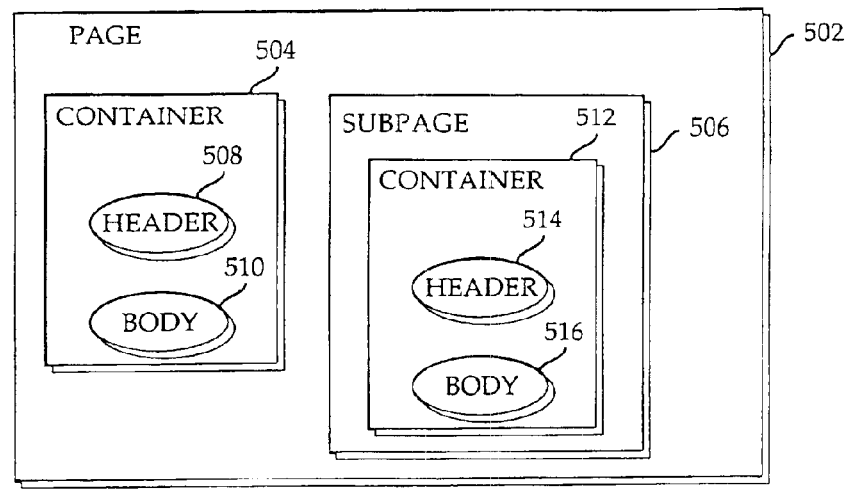
FIGS. 5A–5B illustrates an example of elements of a page and their corresponding controls and name space designations according to an embodiment of the invention.

FIG. 5A illustrates an example of a component structure of a design of a page according to an embodiment of the invention. Page 502 includes container 504 and subpage 506. Container 504 contains header 508 and body 510 elements. Subpage 506 includes container 512 header 514 and body 516.

Figure 5B:
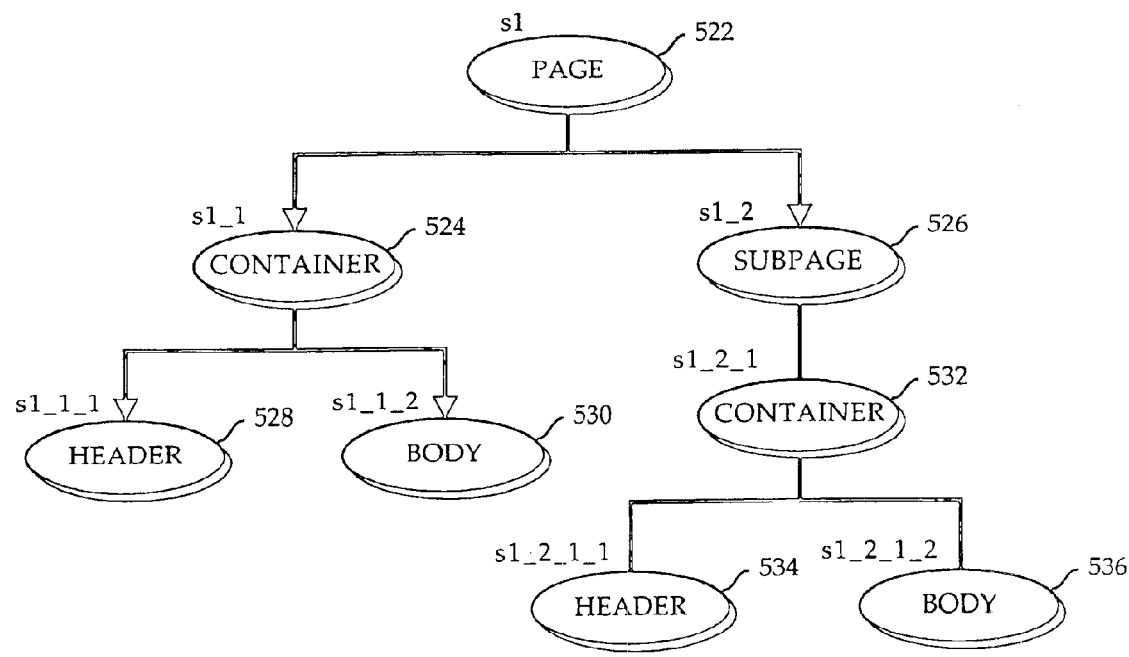

At runtime, controls are instantiated for the components of the page as illustrated in FIG. 5B. Page control 522 corresponds to page 502. Container control 524 and subpage control 526 correspond to container 504 and subpage 506, respectively. Header controls 528 and 534 correspond to header 508 and 514, respectively. Body controls 530 and 536 correspond to body 510 and 516, respectively.

Name space designations are assigned to the controls as needed prior to the generation of HTML by the controls. Page control 522 name space designation is "s1". Page control 522 can assign its own name space designation, or a name space designation can be assigned by a separate process, for example. The first time that a control is requested to generate HTML, a name space designation is generated for the control. A control's name space designation can be generated by page control 522 for all controls, or a parent control (e.g., container or subpage control) can generate a name space designation for its child controls.

A name space designation can illustrate a hierarchy of controls. Generally, a control that is child of another control has a name space designation that includes its parent's name space designation. For example, each of controls 524–536 include page control 522's name space designation. In an embodiment of the invention, a "_" is used to separate the name space designation's used at each level.

Container control 524 and subpage control 526 include page control 522's name space designation "s1". Since container 504 is the first element in page 502, the name space that is assigned to container is "s1", followed by "_" followed by "1" to denote that it is the first element in the page. The controls within container 504 (i.e., header control 528 and body control 530 that correspond to header 508 and 510) include container control 524's name space designation, followed by a "_" and "1" and "2", respectively.

Subpage control 52 corresponds to subpage control 506, the second element in page 502. Its name space designation includes page control 522's name space designation (i.e., "s1"), followed by "_" followed by "2" (i.e., "s1_2"). As the first element in subpage 506, container 512's control (i.e. container control 532) is given subpage control 526's name space designation (i.e., "s1_2"), followed by "_" followed by "1". Header control 534 and body control 536 have name space designations of "s1_2_1_1" and "s1_2_1_2", respectively.

There are two instances of a header control (e.g., header controls 528 and 534) and two instances of a body control (e.g., body controls 530 and 536). However, each instance of these controls has a unique name space designation. Both header controls may generate a label of "headerTxt" for a name attribute. However, each header control appends its name space designation before "headerTxt" in the label. Thus, for example, the labels that are generated by header controls 528 and 534 are "s1_1_1.headerTxt" and "s1_2_1_1.headerTxt", respectively. The name space designation identifies the control that generated the label. Name-value pairs that are submitted using a control-generated label contain information that can be used to identify the control when data is submitted by a browser.

Data Submission

The Web page definition is sent to the browser by the server. The user may return data to the server. For example, the user may enter some data into input elements, for example, in the page and then select a submit operation. A post operation (e.g., an HTTP POST operation) may be used to send the data back to the page control on the server. The page control is invoked on the server to process the contents of the post message. The name portion of a name-value pair that is posted by a browser includes the control-generated labels. Thus, the page control can examine the name-value pairs to determine the appropriate control to receive the data. The page control delivers the data to the control as indicated by the name space designation in the name portion of the name-value pair.

Upon receiving the data, the control processes the data. For example, the control may change its value and may initiate its own event(s). One of the controls will typically be responsible for the HTML element that was used to submit the page or used to cause the HTTP post. The submit control notifies the page control (e.g., by identifying itself as a "pageSubmitProcessor"). After all of the name-value pairs are delivered to the controls, the page control invokes the "submit" control to perform submit processing, if any. Thus, in an embodiment of the invention, the submit processing can be performed after all of the name-value pairs have been processed by the appropriate controls.

Figure 7:
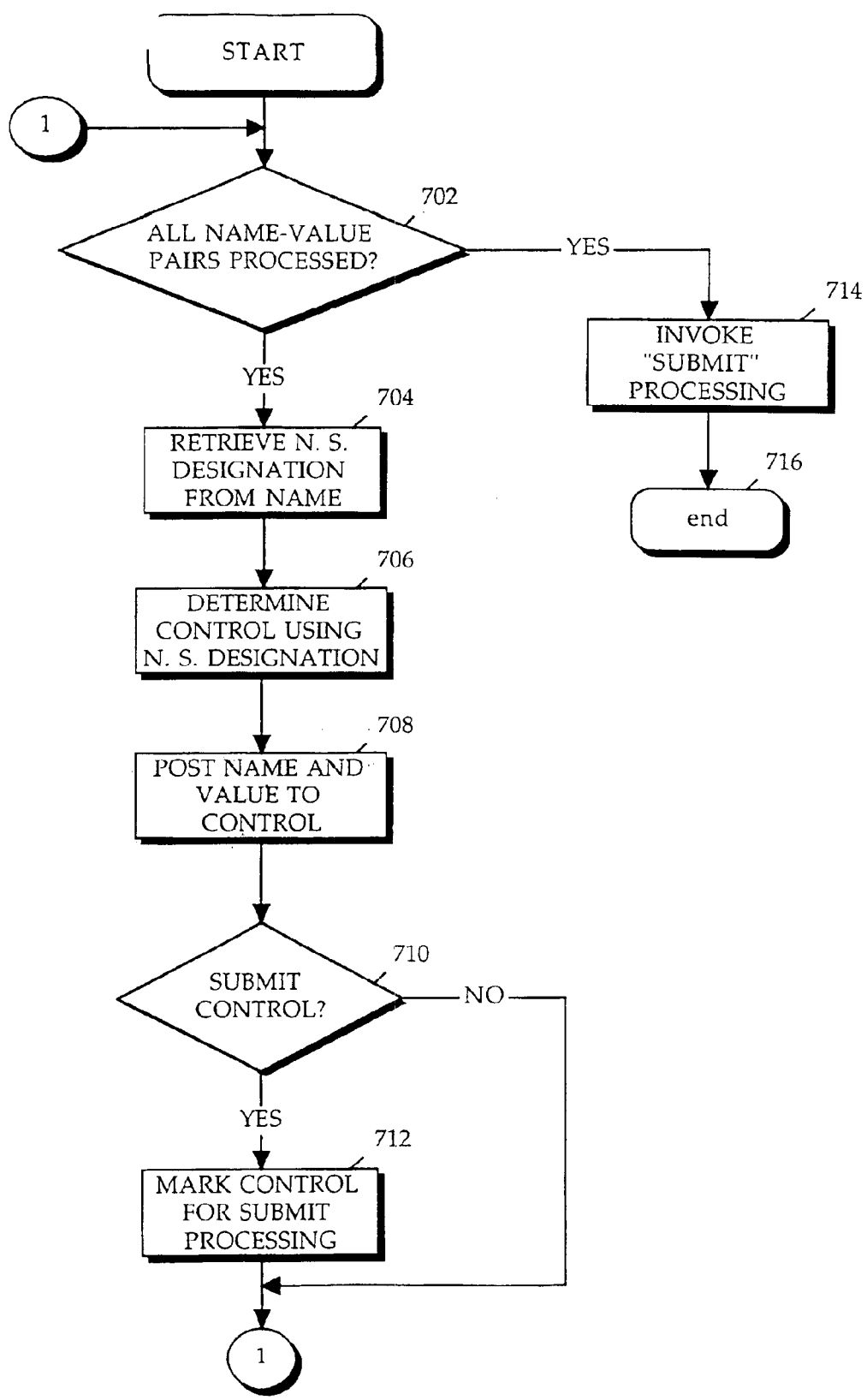
FIG. 7 provides an example of a "name-value pair" submission process flow according to an embodiment of the invention.

FIG. 7 provides an example of a "name-value pair" submission process according to an A embodiment of the invention. At step 702, a determination is made whether all of the submitted name-value pairs have been processed. If so, processing continues at step 714 to invoke any "submit" processing (e.g., invoke a submit method of a submit control). As discussed, a control can indicate that it is to be called to perform processing once all of the data has been posted, for example. Such a control can be called at a step 714 and then end 716.

If it is determined, at step 702, that there are more name-value pairs, processing continues at step 704 to retrieve the name space designation from the name portion of the next name-value pair. At step 706, the name space designation is used to identify the appropriate control. At step 708, the name-value pair is posted (e.g., via a data change event) to the control that is identified in step 706.

A control may respond (e.g., using a return code) to a data posting by indicating that it is to be called to perform submit processing. At step 710, a determination is made whether the control is a submit control. If so, processing continues at step 712 to identify the control as a submit control and processing continues at step 702 to process any remaining name-value pairs. If it is determined, at step 710, that the control is not a submit control, processing continues at step 702.

Dynamic Name Space Designations

A name space designation is assigned to an instance of a control (e.g., a page control, subpage control or other control) to avoid name conflicts between controls. Further, a name space designation may be used to uniquely identify a control. The control is assigned a name space designation dynamically, or just-in-time, as it is needed. When a control is initially asked to generate HTML, it is given a name space designation that it uses to generate data labels for name attributes, for example. Since a name space designation is unique, a data label that includes the name space designation is also unique.

In an embodiment of the invention, a position-based name space designation assignment is used to dynamically assign name space designations. A control's position is determined, for example, by its position in a page design relative to the top left-hand corner of the page layout. The page control typically is given the first name space designation for the page (e.g., "S1"). The first control encountered receives a name space design (e.g., "1") prefixed by the page's name space designation (e.g., "s1"). Reading from left to right and top to bottom, the next controls that are encountered in the page are given the name space designation of "2" and "3", etc.

When a subpage is encountered, controls within the subpage are given name space designations that include the subpage's name space designation. For example, where the subpage is the fifth control encountered in the page, it is given a name space designation of "s1_5" (where "s1" is the page's name space designation), for example. The third control that is encountered within the subpage is given a name space designation of "s1_5_3", for example, where "s1", "5" and "3" specify the page's, subpage's and control's name space designations, respectively. If the third control in the subpage is itself a subpage, the first control that is encountered in the second subpage is given the name space designation of "s1_5_3_1", for example.

Page and subpage may contain controls. Further, controls such as container controls may also contain controls. Like page and subpage controls, the controls that are contained within a container control are given a name space designation that includes the container control's name space designation in an embodiment of the invention.

Thus, in one or more embodiments of the invention, a name space designation reflects a control hierarchy (e.g., a subpage within a page or subpage) as well as uniquely identifying a control. It should be apparent that any naming scheme can be used to generate name space designations to uniquely identify a control and identify a control hierarchy according to embodiments of the invention.

Figure 6A:
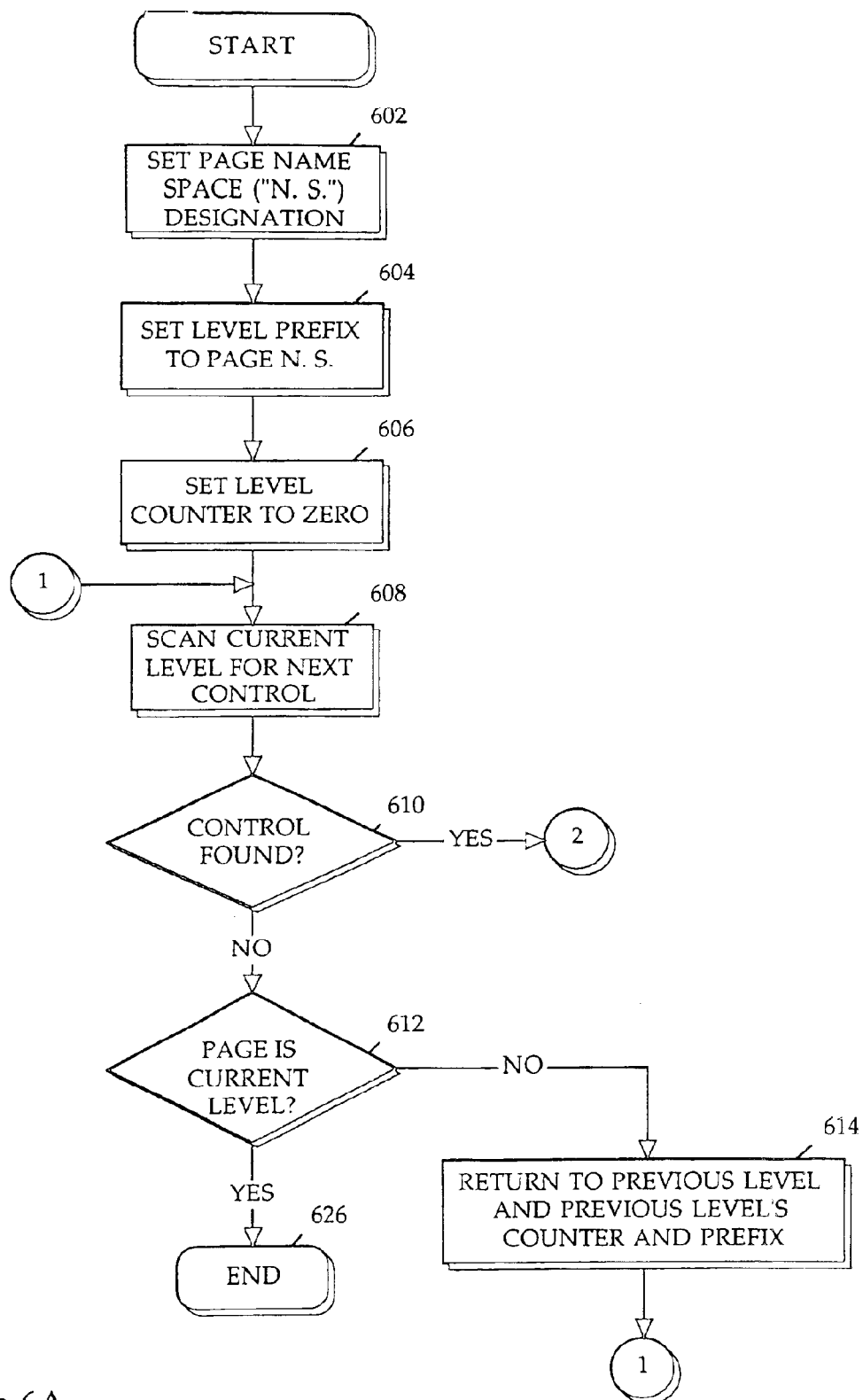
FIGS. 6A–6B provide a name space designation assignment process flow according to an embodiment of the invention.
Figure 6B:
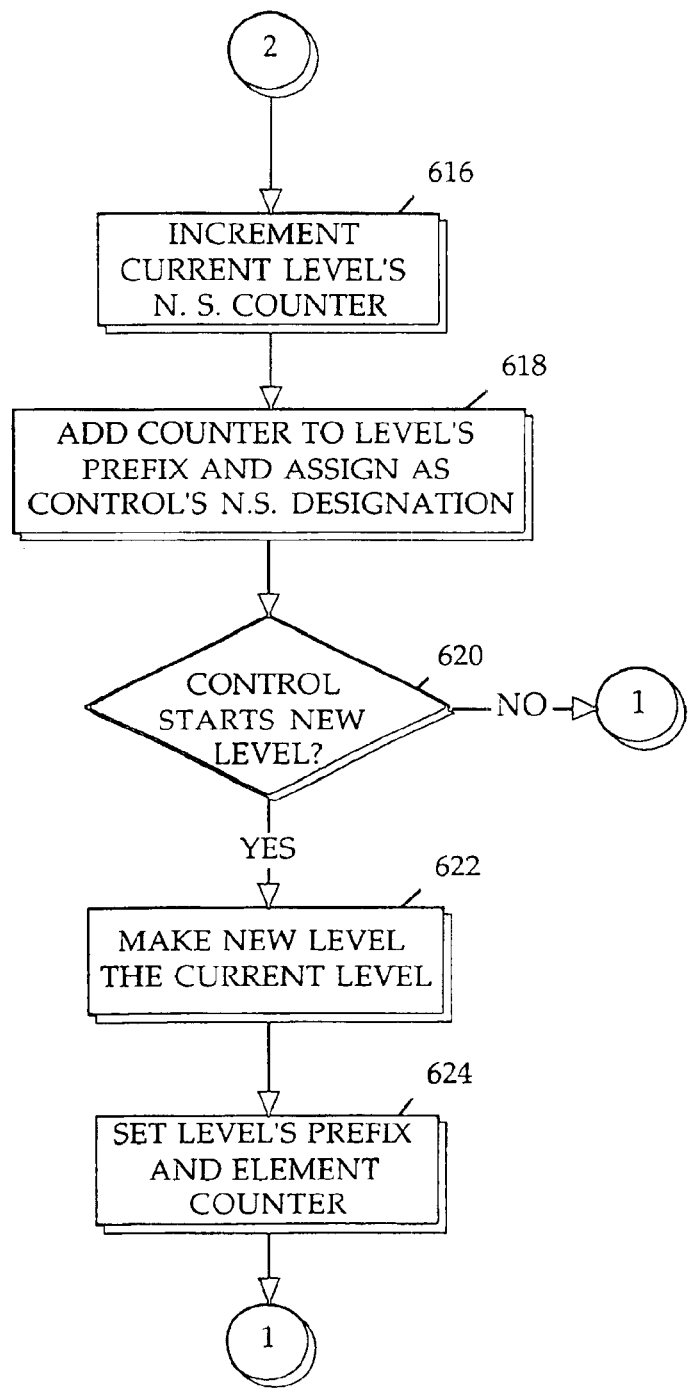

FIGS. 6A–6B provide a name space designation assignment process flow according to an embodiment of the invention. At step 602, the page control's name space designation is assigned. As indicated previously, the page control's name space designation can be assigned by the page control in an embodiment of the invention. At step 604, the current level's (e.g., page level's) prefix is set as the page level's name space designation followed by a "_". An element counter for the current level is set to zero.

At steps 608 and 610 a determination is made whether there are any elements defined at the current level. If not, processing continues at step 612 to determine whether the page is the current level. If so, processing ends at step 626.

If there are no more elements at the current level and the level is not the page level, processing continues at step 614 to return to the previous level and the previous level's counter and prefix. Processing continues at step 608 to process any remaining controls at the current level.

If a control is found at the current level at steps 608 and 610, processing continues at step 616 to assign a name space designation to the control. At step 616, the current level's element counter is incremented. At step 618, the counter is added to the level's prefix to yield a name space designation for the control.

At step 620, a determination is made whether the control begins a new level (e.g., a container or subpage). If not, processing continues at step 608 to process any remaining controls at the current level. If the control begins a new level, processing continues at step 622 to make the new level the current level. At step 624, a level prefix is determined for the new level. The new level's prefix is, for example, the name space designation assigned in step 618 followed by "_". The level's element counter is initialized to zero and processing continues at step 608 to process any controls at the new level.

Shared Name Spaces

In some instances, controls may wish to share items such as, for example, a style definition or script (e.g., a Java script function). A shared or lexical name space name is used to facilitate sharing. A naming convention is adopted for shared name space designations. For example, a shared name space designation can include an Internet domain name of the developer of the shared item. To illustrate, if the Internet domain name is "sssw.com," the shared name space designation might be "com_sssw_*" where "*" represents the label of the shared item.

Dynamic Name Space Lookup

In the page design environment, a developer may wish to refer to a name space designation (e.g., to refer to a control instance for a specific GUI element). However, in embodiments of the invention, a name space designation is not generated until runtime. In this case, a logical (or design-time) name space designation is used at design time. At run time, the design-time name space is mapped to an actual name space by, for example, the page control.

As an example, a developer may generate script program code that contains a reference to the first text element in the page. Instead of using its actual name space designation in the script, the developer uses a design-time name space designation such as "myText1." At run time, program code is added to the script that equates the "page.myText1" design-time name space designation with the actual name space designation for the control. A program code example is:

page.myText1=s1_1 where page.myText is the design-time name space designation and "s1_1" identifies the run time name space designation for the first text contra in the page. Thus, a reference to page.myText1 in the script effectively refers to the control whose run time name space designation is "s1__1" (i.e., the control instance associated with the first text GUI element in the page).

The design-time name space designation may be to a control within a subpage. For example, the design-time name space designation might be page.subpageName.my-Text1. If, the run time name space designation for the page and subpage is "s1" and "s1__1", respectively, the text control's name space designation is "s1__1__1" and the following statement is placed in the script code:

page.subpageName.myText1=s1__1__1 to equate the design-time name space designation (i.e., "page.subpageName.myText1") with the first text control instance within the first subpage within the page.

Container Controls

As discussed above, controls other than page and subpage controls can act as a container mechanism for other controls. For example, a container control can be used to contain controls that can generate rows (and their fields) of a table. Such a container control is referred to as a table control. Other examples of container controls include data view and layout region.

In the case of a tabular control, each row of the table can be thought of as a subpage. The table control invokes the same subpage none or more times giving it a different data set (a row's data set) each time. The layout of each subpage can be in a traditional tabular format or another format.

For example, where a tabular format is used to generate a table having three columns and ten rows, the table control can invoke a subpage that contains three controls (one for each column in the row) ten times. Each control within a row can generate HTML that identifies name and value attributes for its columnar data. Each control is given a name space designation that includes the name space designation for the table control and the control's subpage. The control's name space designation can be used to post modifications made to its data by the browser user, for example.

Thus, a method and apparatus for using name spaces in a graphical user interface has been described in conjunction with one or more specific embodiments. The invention is defined by the claims and their full scope of equivalents.

What is claimed is:

1. A computer program product comprising:
   a computer usable medium having computer readable program code embodied therein for using a name space in generating a graphical user interface (GUI), said computer program product comprising:
   computer readable program code configured to cause a computer to generate one or more elements associated with thee GUI;
   computer readable program code configured to cause the computer to associate the one or more elements of the GUI with at least one control mechanism;
   computer readable program code configured to cause the computer to dynamically generate a unique name space designation for separate instances of said control mechanism at run time, wherein the unique namespace designations identify relationships between the separate instances of said control mechanism including relationships between the separate instances of said control mechanism that occur on a same page;
   computer readable program code configured to use the unique name space designations to formulate unique labels for data associated with the corresponding control mechanism; and
   computer readable program code configured to cause the computer to use said unique name space designation to generate one or more definitional statements for said GUI.

2. The computer program product of claim 1, further comprising:
   computer readable program code configured to cause the computer to identify the control mechanism with which said unique name space designation is associated.

3. The computer program product of claim 2 further comprising:
   computer readable program code configured to cause the computer to configure the unique labels formulated for the data associated with the corresponding control mechanism to include at least the unique name space designation for separate instances of the control mechanism and a descriptive name for the data; and
   computer readable program code configured to cause the computer to identify said control mechanism as a recipient of the data based on the unique name space designation associated with the corresponding unique label.

4. The computer program product of claim 1 wherein said one or more definitional statements are Hypertext Markup Language statements.

5. The computer program product of claim 1 wherein said control mechanism is an object-oriented object.

6. The computer program product of claim 5 wherein said object oriented object is a Java Bean.

7. The computer program product of claim 1 wherein a first of the one or more elements associated with the GUI is defined as being within an influence of a second of the one or more elements associated with the GUI, said computer readable program code configured to cause the computer to associate elements of said GUI with said control mechanism further comprises:
   computer readable program code configured to cause the computer to associate a first unique name space designation with a definitional statement associated with the first of the one or more elements associated with the GUI; and
   computer readable program code configured to cause the computer to associate a second unique name space designation with one or more definitional statements associated with the second of the one or more elements associated with the GUI, said second unique name space designation including said first unique name space designation.

8. The computer program product of claim 1, wherein said computer readable program code causes the computer to dynamically generate the unique name space designation for at least one instance of said control mechanism at run time, based on a position of the control mechanism within the GUI.

9. The computer program product of claim 1, wherein the unique namespace designations identify relationships between the separate instances of said control mechanism further including relationships between the separate instances of said control mechanism that occur on different pages.

10. In a computer system, a method of using a name space in generating a graphical user interface (GUI) comprising:
    modeling a component of the graphical user interface (GUI) as a control, said control being implemented as program code;
    dynamically generating at least one definitional statement for one or more instances of said component associated with the GUI using said program code, said definitional statement including at least one attribute for the one or more instances of said component;

dynamically generating a unique name space designation for the one or more instances of the component at run-time, wherein the unique namespace designations identify relationships between the one or more instances of the component including relationships between the one or more instances of the component that occur on a same page; and assigning the unique name space designation to the component, wherein said unique name space designation is used to name at least one attribute generated by the component, wherein the name associated with the at least one attribute is uniquely derived from said one or more instances of said component.

11. The method of claim 10 further comprising generating a label to be associated with data, wherein the label includes the unique name space designation that corresponds to an associated instance of the component.

12. The method of claim 11 further comprising identifying the associated instance of the component as a recipient of the data based on the unique name space designation in said label.

13. The method of claim 10 wherein said program code is an object-oriented object.

14. The method of claim 10 wherein said at least one definitional statement is a Hypertext Markup Language statement.

15. The method of claim 10 further comprising generating a design for said GUI, said design including a plurality of GUI components.

16. The method of claim 15 wherein a first of said plurality of GUI components in said design is located within a second of said plurality of GUI components and wherein said unique name space designation is associated with said second of said plurality of GUI components, the method further comprising:

generating at least one definitional statement for said first of said plurality of GUI components using said program code, said definitional statement including at least one attribute for said first of said plurality of GUI components, said at least one attribute comprising a first unique name space designation which includes said name space designation associated with said second of said plurality of GUI components.

17. A graphical user interface (GUI) system comprising:
a processor that implements program code, said program code configured to:
generate at least one component of the GUI as a corresponding control;
dynamically generate at least one definitional statement for one or more instances of the at least one component, wherein the at least one definitional statement includes at least one attribute for said one or more instances of the at least one component;
dynamically generate a unique name space designation for the one or more instances of the at least one component at run-time, wherein the unique namespace designations identify relationships between the one or more instances of the at least one component including relationships between the one or more instances of the at least one component that occur on a same page; and
assign the unique name space designation to the corresponding at least one component, wherein said unique name space designation is used to name at least one attribute generated by the at least one component, wherein the name associated with the at least one attribute is uniquely derived from said one or more instances of the at least one component.

18. The system of claim 17 wherein said at least one definitional statement includes a name attribute, said name attribute including a data label associated with the unique name space designation.

19. The system of claim 18 further comprising a browser application that is configured to generate a name-value pair, wherein a name portion of said name-value pair includes said data label.

20. The system of claim 19 further comprising a page control configured to examine said name portion of said name-value pair and to direct said name-value pair to a destination based on said unique name space designation in said name portion.

21. The system of claim 17 wherein said control the at least one component is an object-oriented object.

22. The system of claim 17 wherein said control is a Java Bean.

23. A computer program product, comprising:
a computer usable medium having computer readable program code embodied therein for using a name space in generating a graphical user interface (GUI), the computer program product comprising:
computer readable program code configured to cause a computer to generate one or more elements associated with the GUI;
computer readable program code configured to cause the computer to associate the one or more elements of the GUI with at least one control mechanism;
computer readable program code configured to cause the computer to dynamically generate a unique name space designation for instances of the control mechanism at run time, wherein the unique name space designation that is assigned to the corresponding control mechanism is used to formulate unique labels for data associated with the corresponding control mechanism, and wherein the unique labels for data are transmitted between applications residing on client terminals and servers; and
computer readable program code configured to cause the computer to use the unique name space designation to generate one or more definitional statements for the GUI.

24. The computer program product of claim 23, further comprising:
computer readable program code configured to cause the computer to identify the control mechanism with which said unique name space designation is associated.

25. The computer program product of claim 23 further comprising:
computer readable program code configured to cause the computer to configure the unique labels formulated for the data associated with the corresponding control mechanism to include at least the unique name space designation for instances of the control mechanism and a descriptive name for the data; and
computer readable program code configured to cause the computer to identify said control mechanism as a recipient of the data based on the unique name space designation associated with the corresponding unique label.

26. The computer program product of claim 23 wherein a first of the one or more elements associated with the GUI is defined as being within an influence of a second of the one or more elements associated with the GUT, the computer readable program code configured to cause the computer to associate elements of the GUI with the control mechanism further comprises:

computer readable program code configured to cause the computer to associate a first unique name space designation with a definitional statement associated with the first of the one or more elements associated with the GUI; and computer readable program code configured to cause the computer to associate a second unique name space designation with one or more definitional statements associated with the second of the one or more elements associated with the GUI, the second unique name space designation including the first unique name space designation.

27. A computer program product, comprising:

a computer usable medium having computer readable program code embodied therein for using a name space in generating a graphical user interface (GUI), the computer program product comprising:

computer readable program code configured to cause a computer to generate one or more elements associated with the GUI;

computer readable program code configured to cause the computer to associate the one or more elements of the GUI with at least one control mechanism;

computer readable program code configured to cause the computer to dynamically generate unique name space designations for instances of the control mechanism at run time, based on a position of the instances of the control mechanism within the GUI, wherein the unique name space designation that is assigned to the corresponding instance of the control mechanism is used to formulate unique labels for data associated with the instance of the corresponding control mechanism; and computer readable program code configured to cause the computer to use the unique name space designation to generate one or more definitional statements for the GUI.

28. The computer program product of claim 27, further comprising:

computer readable program code configured to cause the computer to identify the control mechanism with which said unique name space designation is associated.

29. The computer program product of claim 27 further comprising:

computer readable program code configured to cause the computer to configure the unique labels formulated for the data associated with the corresponding control mechanism to include at least the unique name space designation for instances of the control mechanism and a descriptive name for the data; and computer readable program code configured to cause the computer to identify said control mechanism as a recipient of the data based on the unique name space designation associated with the corresponding unique label.

30. The computer program product of claim 27 wherein a first of the one or more elements associated with the GUI is defined as being within an influence of a second of the one or more elements associated with the GUI, the computer readable program code configured to cause the computer to associate elements of the GUI with the control mechanism further comprises:

computer readable program code configured to cause the computer to associate a first unique name space designation with a definitional statement associated with the first of the one or more elements associated with the GUI; and computer readable program code configured to cause the computer to associate a second unique name space designation with one or more definitional statements associated with the second of the one or more elements associated with the GUI, the second unique name space designation including the first unique name space designation.

31. The computer program product of claim 27, wherein the one or more definitional statements are Hypertext Markup Language statements.

* * * * *